United States Patent [19]

Obrecht

[11] 4,231,959

[45] Nov. 4, 1980

[54] PHOSGENE MANUFACTURE

[75] Inventor: Robert P. Obrecht, Orinda, Calif.

[73] Assignee: Stauffer Chemical Company, Westport, Conn.

[21] Appl. No.: 878,032

[22] Filed: Feb. 15, 1978

[51] Int. Cl.³ .............................................. C07C 51/58
[52] U.S. Cl. ................................................. 260/544 K
[58] Field of Search ................................... 260/544 K

[56] References Cited

U.S. PATENT DOCUMENTS

| 1,231,226 | 6/1917 | Whitehouse | 260/544 K |
| 1,457,493 | 6/1923 | Broehner | 260/544 K |
| 2,847,470 | 8/1958 | Douthitt | 260/544 K |
| 3,331,873 | 7/1967 | DeLong et al. | 260/544 K |
| 4,073,806 | 2/1978 | Doubovetyky et al. | 260/544 K |

FOREIGN PATENT DOCUMENTS

| 2600387 | 7/1976 | Fed. Rep. of Germany | 260/544 K |
| 71-6693 | of 1971 | South Africa . | |
| 583477 | 12/1946 | United Kingdom | 260/544 K |

OTHER PUBLICATIONS

Longatte et al., "Chem. Ab.", 78:60333f (1973).
Csuros et al., "Chem. Ab." 74:66194a (1974).

Primary Examiner—Paul J. Killos
Attorney, Agent, or Firm—William C. Gerstenzang

[57] ABSTRACT

Raw material yields are increased and waste disposal requirements are decreased in the preparation of phosgene by the reaction of chlorine with an excess of carbon monoxide in the presence of an activated carbon catalyst by recovering unreacted carbon monoxide and recycling it to the reaction zone.

8 Claims, No Drawings

PHOSGENE MANUFACTURE

BACKGROUND OF THE INVENTION

The present invention relates to a process for the preparation of phosgene by the exothermic reaction of chlorine with carbon monoxide in the presence of an activated carbon catalyst. More particularly, the present invention relates to a process for the preparation of phosgene by the reaction of chlorine and carbon monoxide in which both raw materials are efficiently utilized and in which the amount of unreacted raw material, particularly carbon monoxide, discarded as a waste material is minimized.

The basic process for producing phosgene by the exothermic reaction of chlorine with carbon monoxide in the presence of a carbon catalyst is well-known in the art. In accordance with the well-known process, a vapor phase mixture of chlorine and carbon monoxide is introduced into a reactor containing an activated carbon catalyst whereupon the chlorine and carbon monoxide react to form phosgene as shown by the equation:

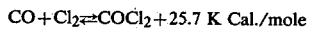
$$CO + Cl_2 \rightleftharpoons COCl_2 + 25.7 \text{ K Cal./mole}$$

In most commercial applications, two reactors are used in series. In the first or "primary" reactor, the major portion of the reactants are converted to phosgene; this is followed by the second or "finishing" reactor where the residual unreacted components are further reacted to achieve substantially complete conversion of the reactants to phosgene.

It is generally desirable to convert as much of the chlorine feed to phosgene as is possible and to minimize the amount of residual chlorine in the reaction product. This is generally accomplished by maintaining a stoichiometric excess of carbon monoxide in the reactor to drive the reaction towards completion with respect to chlorine.

Phosgene is recovered from the product gases by passing the gases through a cooling system where they are cooled sufficiently to cause the phosgene contained therein to condense out. The condensed phosgene is then recovered as a liquid product (usually under pressure).

The noncondensed product gases, containing unreacted carbon monoxide (i.e., the excess carbon monoxide that was fed to the reactor and which passed through it unreacted), chlorine, hydrogen chloride, and other by-products as well as a small amount of phosgene, are then passed through an absorption system where the hydrogen chloride and phosgene are neutralized by a dilute caustic solution. The product gases, minus the hydrogen chloride and phosgene which were absorbed in the absorption system, are vented from the absorption system to an incinerator where they are burned.

Although this basic process is very efficient with respect to chlorine conversion, it is not as efficient as is desired with respect to carbon monoxide. This is because the excess carbon monoxide in the original charge to the reactor passes through the reactor unreacted and is then incinerated. This represents a waste of this raw material. As a result, the net amount of carbon monoxide consumed by this process is substantially more than the amount actually necessary for the reaction to form phosgene.

A need therefore exists for a process for preparing phosgene by the reaction of chlorine with carbon monoxide which does not require a substantial net excess of either raw material.

SUMMARY OF THE INVENTION

It is an object of the present invention to provide a process for the preparation of phosgene from chlorine and carbon monoxide in which the excess amount of carbon monoxide consumed over the stoichiometric requirement is substantially reduced.

It is another object of this invention to provide a process for the preparation of phosgene from chlorine and carbon monoxide in which the amount of carbon monoxide which is discarded as a waste product is substantially reduced.

These and other objects are realized in accordance with the present invention by conducting the reaction between chlorine and carbon monoxide in the presence of an excess of carbon monoxide and then recovering at least a portion of the excess carbon monoxide from the reaction product and recycling it to the reactor along with the chlorine and fresh carbon monoxide feeds.

DETAILED DESCRIPTION OF THE INVENTION

In accordance with the present invention, there is provided an improved process for preparing phosgene by reacting chlorine with carbon monoxide in a reaction zone to produce a product comprising phosgene and unreacted carbon monoxide and separating substantially all of the phsogene from the unreacted carbon monoxide wherein the improvement comprises recycling at least a portion of the unreacted carbon monoxide to the reaction zone whereby the raw material yield of the process is increased and the amount of carbon monoxide discarded as a waste stream is reduced.

In preparing phosgene by the process of this invention, a mixture of chlorine and carbon monoxide vapors is fed into a first reaction zone containing an activated carbon catalyst. This first reaction zone, referred to hereinafter as the "primary reactor," is followed by a second reaction zone, referred to hereinafter as the "finishing reactor." The reaction between the chlorine and carbon monoxide is essentially completed in the primary reactor, and the finishing reactor is employed to "clean up" residual unreacted chlorine remaining in the product from the primary reactor. The reactor effluent gas (i.e., the final product resulting from passage of the charge through first the primary and then the finishing reactor) should generally contain no more than about 200 PPM unreacted chlorine. To accomplish this, it is generally necessary to maintain an excess of carbon monoxide in the reactor ranging from about 5 to about 20 mol percent and preferably from about 10 to about 15 mol percent.

The fresh carbon monoxide which is used to prepare the feed gas mixture is usually supplied from an on-site generating plant and may contain trace amounts of hydrogen, methane, and nitrogen. The carbon monoxide is supplied at a gauge pressure ranging from about 5.0 to about 10.0 kg./cm.$^2$ The chlorine which is used to prepare the feed mixture is usually supplied in liquid form, being vaporized by heating it in vaporizers to form a vapor at a gauge pressure ranging from about 5.0 to about 10.0 kg./cm.$^2$ prior to being mixed with the carbon monoxide.

The chlorine and carbon monoxide are mixed together in appropriate quantities by any one of a variety of techniques known in the art for mixing gases. In a preferred method, the two gases are passed together through a pipe section having a static mixer which is designed to uniformly mix the two gases. Alternatively, they may be passed together through a pipe equipped with a venturi mixing jet or a mixing orifice. The final feed mixture is generally supplied to the reactor at a temperature ranging from about 40° to about 90° C. and a gauge pressure ranging from about 5.0 to about 10.0 kg./cm.$^2$ This feed mixture is supplemented, in accordance with the practice of this invention, by adding to it "recycled carbon monoxide" which is recovered from the final product, as will be described hereinafter. The recycled carbon monoxide may be added to either of the feed streams prior to mixing by use of a non-lubricated compressor, or it may be added directly to the mixing device as a third separate feed stream. More importantly, the kinetic energy of the incoming chlorine or "fresh" carbon monoxide may be used via a venturi jet to pump up the recycle carbon monoxide to the process inlet pressure.

The ratio of total carbon monoxide to chlorine in the feed gas mixture is adjusted to provide a stoichiometric excess of carbon monoxide in the feed to the primary reactor. Thus, the amount of "fresh" carbon monoxide used in preparing the feed gas mixture will vary in accordance with the specific amount of excess carbon monoxide desired in the reaction zone and the amount of recycle carbon monoxide supplied to the mixture.

The amount of carbon monoxide excess in the reaction zone can vary from as little as about 2% to as much as about 30% or more of the stoichiometric amount required to react with the chlorine. In general, however, there is little benefit obtained from excesses above about 20% and any increased conversion achieved by excesses above this amount are often outweighed by the increased costs which are likely to be associated with the maintenance of such high excesses. Therefore, it is preferred to maintain a carbon monoxide excess in the reaction zone ranging from about 10 to about 25% of stoichiometric.

The reaction between chlorine and carbon monoxide is, as mentioned earlier, highly exothermic. As a result of the exothermic nature of the reaction, the reacting mass can reach temperatures as high as 500° C. or more. Such high temperatures can lead to certain difficulties in that the phosgene, once formed, tends to dissociate at elevated temperatures. Therefore, the reaction product should be cooled as soon as possible after the formation of the phosgene.

The rapid cooling of the reaction product to minimize dissociation of phosgene is preferably accomplished within the reactor itself using either a "shell-and-tube-type reactor" or a jacketed tank-type of reactor.

The "shell-and-tube-type" of reactor closely resembles a shell-and-tube heat exchanger. This type of reactor is preferably used for the primary reactor. In the shell-and-tube-type of reactor, the activated carbon catalyst is contained within the tubes, and the tubes are surrounded by cooling water circulating through the shell. The circulating water cools the tubes as well as the product gases contained within them. The temperature of the cooling water is controlled by external means in accordance with the temperature desired for the product coming out of the reactor. Alternatively, the reactor can be cooled by boiling water (i.e., using a thermosyphon) to produce useful steam.

Although the shell-and-tube-type reactor can also be used for the finishing reactor, it is generally not necessary for this application because the amount of heat released in the finishing reactor is preferably substantially less than that released in the primary reactor, and the large cooling capacity of a shell-and-tube reactor is not needed. Therefore, it is preferred to use a conventional water- or low pressure steam-jacketed tank-type of reactor for this application. This type of reactor comprises a fixed bed of activated carbon catalyst contained within a "tank" having a cooling jacket. Cooling water may be circulated through the jacket in the same manner as it is circulated around the tubes in a shell-and-tube reactor to control the temperature within.

In cooling the reaction product within the reactors, care should be exercised that it is not cooled so much as to cause the premature condensation of phosgene. Should the phosgene begin to condense within the cooling section of the reactors, the flow through the reactors could become restricted by the condensate and cause operating difficulties. This is generally avoided by maintaining the cooling water at a temperature which is not less than the due point of the reaction product—usually ranging from about 40°-60° C. depending on pressure.

The gauge pressure of the reacting gases within the reactors ranges from about 5.0 kg./cm.$^2$ to about 10 kg./cm.$^2$ depending upon a number of factors such as feed gas pressure, throughput rate, reactor size, downstream equipment size, and the like. In addition, the product gases are corrosive since they contain hydrogen chloride and chlorine. Therefore, the reactors should be designed to operate at elevated pressures, and the process side of the reactors should be constructed of corrosion-resistant material such as monel, stainless steel, or the like.

The final reaction (gaseous) product, after having passed through both the primary and finishing reactors under proper operating conditions, will contain, in addition to phosgene and unreacted carbon monoxide, small amounts (i.e., generally less than about 10% by weight each) of nitrogen and hydrogen chloride, and trace amounts (i.e., generally less than about 1% by weight each) of oxygen and carbon tetrachloride and preferably less than 100 PPM chlorine.

The phosgene contained in this final reaction product is then recovered by condensing and collecting it as a liquid product.

The final reaction product gases, at a temperature ranging from about 50° C. to 70° C. and a gauge pressure ranging from about 1.5 kg./cm.$^2$ to about 4.5 kg./cm.$^2$, are introduced into a condensation system where they are cooled to the point where essentially all of the phosgene is condensed and can be collected as a liquid product. In this system, the gases are first cooled as much as is practicable using water cooled equipment and then further cooled using refrigeration cooling equipment. Depending on the temperature of available cooling water, it will generally be practicable to cool the product gases to about 30° to 40° C. using standard water cooled shell-and-tube heat exchangers. When cooled to this temperature and at a gauge pressure ranging from about 1.5 kg./cm.$^2$ to about 4.25 kg./cm.$^2$, approximately 50-80% of the phosgene can be condensed out of the product gases and collected.

After being cooled as much as practicable using water cooled heat exchangers, the product gases are next introduced into refrigeration cooled heat exchangers where they are preferably cooled to temperatures ranging from about −20° C. to about −30° C. whereupon the remainder of the phosgene is condensed out and recovered.

With essentially all of the phosgene removed, the main component remaining in the noncondensed product gases is carbon monoxide. The carbon monoxide remaining in the product gas has traditionally been considered a waste product and has heretofore been disposed of accordingly.

In accordance with the present invention, the carbon monoxide which remains in the product gases is recovered and recycled to the reactors where it becomes a part of the raw material feed. By recovering this valuable raw material from what has heretofore been considered a waste stream, the present invention enables a net reduction in the amount of carbon monoxide consumed in the preparation of phosgene as well as a reduction of the waste disposal requirements associated with the phosgene manufacturing process. These benefits are derived in accordance with the present invention while continuing to maintain reactor conditions which are essentially equivalent to those of the prior art methods with respect to excess carbon monoxide.

Most or any part of the carbon monoxide-rich gas may be recycled to the reactor in accordance with the present invention. The amount which is recycled will depend on many factors such as the cost of "fresh" carbon monoxide, the cost of disposing of "carbon monoxide waste gas," the amount and nature of contaminants present in the recovered carbon monoxide-rich gas, and the like.

The carbon monoxide can be recycled back to the reactor using motive power provided by any of a variety of techniques. Thus, for example, after passing through a liquid knockout pot or an entrainment separator, it can be supplied to a mechanical compressor which increases the pressure of the gas sufficiently to transfer it back to the reactor, or it can be inducted into either of the fresh feed streams using a jet compressor (i.e., an ejector) in which either fresh feed stream serves as the pumping fluid.

The product gases may, in some cases, contain some contaminant oxygen which can have an adverse effect on the activated carbon catalyst if present in the recycled gas in large quantities (i.e., above about 2% by weight). Thus, if oxygen content in the reactor is permitted, for example, to exceed about 1.5 mol percent (based on carbon monoxide), a measurable amount of combustion of the activated carbon catalyst can occur. In order to obtain extended catalyst life, oxygen content in the primary reactor feed gas should be controlled at less than about 0.25 mol percent (based on carbon monoxide).

In order to limit the accumulation of these contaminants in the recycle gas stream, a portion of the recyclable gases (i.e., the product gases after the phosgene has been removed) should be purged prior to recycling. It has been determined that purge rates ranging from about 10 to about 35% of the recyclable product gases are sufficient to enable a reasonable catalyst life in most cases. Therefore, the amount of carbon monoxide which is recycled usually ranges from about 65 to about 90% of the carbon monoxide contained in the product coming out of the reactors.

The purge gas may properly be disposed of by scrubbing it with a dilute caustic solution to neutralize and remove hydrogen chloride and phosgene and then incinerating the remainder.

The caustic scrubbing can be accomplished by passing the gas through an absorption column in which a dilute caustic solution (i.e., about 3-5% sodium hydroxide) is circulating. The unabsorbed gases are then vented from the absorption column to an incinerator. The total amount of gases to be incinerated will, of course, be substantially less than would be the case if all of the carbon monoxide were to be incinerated as in the prior art. Therefore, in addition to reducing the total amount of raw material required to produce phosgene, this invention also substantially reduces the waste disposal load, equipment, and other requirements associated with the process.

In order that the present invention be more fully understood, the following example is given by way of illustration. No specific details or enumerations contained therein should be construed as a limitation on the present invention except insofar as they appear in the appended claims.

EXAMPLE

Liquid chlorine is vaporized and fed at a temperature of about 23° C. and a pressure of about 90 PSIG (6.3 kg./cm.$^2$) to the inlet nozzle of a venturi jet pump which discharges into the inlet of the primary reactor of a commercial phosgene plant at a rate of 100 pound moles (45.36 kg. mols) per hour. The chlorine vapor stream contains 99.6 mol percent chlorine. A recycle carbon monoxide vapor stream at a temperature of −10° to −30° C. is fed to the suction part of the jet pump at a rate of 16.25 pound mols (7.37 kg. mols) per hour. A "fresh" carbon monoxide vapor stream, comprising 99.5 mol percent carbon monoxide, 0.12 mol percent methane, and 0.05 mol percent oxygen—the balance being nitrogen—, is also fed to the inlet of the primary reactor at a temperature of 30° C. and a rate of 104.4 pound moles (47.35 kg. mols) per hour.

The three feed streams (chlorine, "fresh" carbon monoxide, and recycled carbon monoxide) are mixed together by a mixing orifice in the primary reactor inlet line. The mixed gases pass through the reactor, which is a shell and tube-type reactor in which the tubes are packed with an activated carbon catalyst (having a surface area of 1100 m.$^2$/gm.) and are surrounded by circulating cooling water in the shell. The carbon monoxide and chlorine gases react to form phosgene as they pass through the catalyst-containing tubes of the reactor. The heat generated by the exothermic reaction is absorbed by the water in the shell of the reactor, the temperature of which is set to maintain the temperature of the product vapors coming out of the reactor above their dew point.

About 99% of the chlorine is converted to phosgene in the primary reactor.

The product stream from the primary reactor is then passed through a jacketed-tank-type finishing reactor. This reactor is filled with the same type of activated carbon catalyst as is used in the primary reactor tubes and is surrounded by cooling water circulating through the jacket. Most of the remaining 1% of the original chlorine charge is converted to phosgene as it passes through the catalyst bed of the finishing reactor.

The product from the finishing reactor, at a temperature of 50° to 70° C., passes to a water cooled shell and tube heat exchanger where it is cooled to a temperature of 30° to 40° C., which causes the partial condensation of the phosgene.

The cooled, partially condensed product flows from the water cooled heat exchanger to a surge tank where the liquid fraction is collected and the vapor fraction vented to a refrigerant-cooled shell and the tube heat exchanger. In the refrigerant-cooled heat exchanger, the product is further cooled to a temperature of −25° C., thereby condensing essentially all of the remaining phosgene. This stream then passes to a knock-out tank where the liquid and vapor fractions are separated. The liquid fraction is transferred from the knock-out tank back to the surge tank where it is mixed with the liquid collected from the water cooling step while the vapor fraction is partially vented to a waste disposal system and partially recycled to the primary reactor.

The phosgene accumulated in the surge tank plus that transferred from the knock-out tank amounts to 99.6 pound mols (44.9 kg. mols) per hour and comprises about 99.96 mol percent phosgene, 0.02 mol percent carbon tetrachloride, and trace quantities of hydrogen chloride and chlorine.

The vapor fraction which is vented from the knock-out tank (at a pressure of about 58 PSIG (4.1 kg./cm.$^2$)) comprises 71.3 mol percent carbon monoxide, 15.6 mol percent nitrogen, 1.2 mol percent oxygen, 8.9 mol percent hydrogen chloride, 3.4 mol percent phosgene, and 0.2 mol percent carbon tetrachloride. This stream amounts to 21.6 pound mols (9.8 kg. mols) per hour. Of the total stream, 16.25 pound mols (7.4 kg. mols) per hour are recycled to the primary reactor, and 5.35 pound mols (2.4 kg. mols) per hour are vented to the waste disposal system.

The waste disposal system to which the purge stream is vented comprises a caustic scrubbing system followed by an incinerator. Hydrogen chloride and phosgene contained in the purge stream are neutralized and absorbed by a circulating 3% caustic solution in the scrubber and then the balance of the purge gas stream is burned in the incinerator.

The recycle gas stream is fed to the suction part of the venturi jet pump as previously discussed.

The phosgene yield is calculated to be 99.3% on chlorine charge and 96% on carbon monoxide charge.

It will thus be seen that the present invention provides a process for preparing phosgene from chlorine and carbon monoxide which does not require a substantial net excess of carbon monoxide, achieves high raw material efficiency with respect to both raw materials, and substantially reduces the amount of carbon monoxide which is discarded as a waste product by comparison to the prior art processes.

The objects set forth above, among those made apparent from the peceding description, are therefore effectively attained and, since certain changes may be made in the above process without departure from the steps of the invention, it is intended that all matter contained in the above description shall be interpreted as illustrative and not in a limiting sense.

What is claimed:

1. An improved process for preparing phosgene by reacting chlorine with substantially pure carbon monoxide in a reaction zone to produce a product gas mixture comprising phosgene and unreacted carbon monoxide, separating substantially all of said phosgene from said unreacted carbon monoxide by passing the gas mixture through a partial condensation zone and recycling a major portion of said unreacted carbon monoxide directly to said reaction zone whereby the raw material yield of the process is increased and the amount of carbon monoxide discarded as a waste stream is reduced.

2. An improved process in accordance with claim 1 wherein the portion of said unreacted carbon monoxide which is recycled ranges from about 65 to about 90% of the total amount of said unreacted carbon monoxide.

3. An improved process in accordance with claim 1 wherein said carbon monoxide is recycled to said reaction zone through the use of a jet compressor in which either fresh feed stream serves as the pumping fluid.

4. A process for preparing phosgene comprising the steps of:
   (a) reacting gaseous chlorine with substantially pure gaseous carbon monoxide in a reaction zone to produce a gaseous product comprising phosgene and unreacted carbon monoxide;
   (b) cooling said gaseous product to condense out substantially all of said phosgene from said gaseous product; and
   (c) recycling a major portion of the remainder of said gaseous product to said reaction zone.

5. A process in accordance with claim 4 wherein said reaction is conducted in the presence of an activated carbon catalyst.

6. A process in accordance with claim 5 wherein said carbon monoxide is present in said reaction zone in an amount which is in excess of the stoichiometric requirement.

7. A process in accordance with claim 6 wherein said excess ranges from about 5 to about 20% of said stoichiometric requirement.

8. A process in accordance with claim 7 wherein the portion of said remainder of said gaseous product which is not recycled to said reaction zone is purged.

* * * * *